(12) United States Patent
Olorenshaw et al.

(10) Patent No.: US 7,139,708 B1
(45) Date of Patent: Nov. 21, 2006

(54) SYSTEM AND METHOD FOR SPEECH RECOGNITION USING AN ENHANCED PHONE SET

(75) Inventors: Lex S. Olorenshaw, Corte Madera, CA (US); Mariscela Amador-Hernandez, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/369,031

(22) Filed: Aug. 4, 1999

Related U.S. Application Data

(60) Provisional application No. 60/125,890, filed on Mar. 24, 1999.

(51) Int. Cl.
*G10L 15/06* (2006.01)

(52) U.S. Cl. ................. 704/254; 704/255; 704/243

(58) Field of Classification Search ........ 704/251–257, 704/235
See application file for complete search history.

(56) References Cited

U.S. PATENT DOCUMENTS

| | | | |
|---|---|---|---|
| 4,592,085 A | 5/1986 | Watari et al. | 381/43 |
| 5,390,278 A | 2/1995 | Gupta et al. | 395/2.52 |
| 5,621,859 A | 4/1997 | Schwartz et al. | 395/2.65 |
| 5,623,609 A * | 4/1997 | Kaye et al. | 704/255 |
| 5,715,367 A | 2/1998 | Gillick et al. | 395/2.63 |
| 6,073,099 A * | 6/2000 | Sabourin et al. | 704/254 |
| 6,317,712 B1 * | 11/2001 | Kao et al. | 704/256 |
| 6,408,270 B1 * | 6/2002 | Garber | 704/254 |

OTHER PUBLICATIONS

Rowden, Chris, Speech Processing, McGraw-Hill International, 1992, pp. 192, 193, 238, 239 and 246-249.*
Lee, Kai-Fu and Hsiao-Wuen Hon, "Speaker-Independent Phone Recognition Using Hidden Markov Models," IEEE Transactions on Acoustics, Speech, and Signal Processing, vol. 37, No. 11, Nov. 1989, pp. 1641-1648.
Ljolje, Andrej, "High Accuracy Phone Recognition Using Context Clustering and Quasi-Triphonic Models," Computer Speech and Language, 8, 1994, pp. 129-151.
Young, S.J. and P.C. Woodland, "State Clustering in Hidden Markov Model-Based Continuous Speech Recognition," Computer Speech and Language, 8, 1994, pp. 369-383.

* cited by examiner

*Primary Examiner*—David D. Knepper
(74) *Attorney, Agent, or Firm*—Gregory J. Koerner; Redwood Patent Law

(57) ABSTRACT

A system and method for speech recognition using an enhanced phone set comprises speech data, an enhanced phone set, and a transcription generated by a transcription process. The transcription process selects appropriate phones from the enhanced phone set to represent acoustic-phonetic content of the speech data. The enhanced phone set includes base-phones and composite-phones. A phone dataset includes the speech data and the transcription. The present invention also comprises a transformer that applies transformation rules to the phone dataset to produce a transformed phone dataset. The transformed phone dataset may be utilized in training a speech recognizer, such as a Hidden Markov Model. Various types of transformation rules may be applied to the phone dataset of the present invention to find an optimum transformed phone dataset for training a particular speech recognizer.

51 Claims, 10 Drawing Sheets

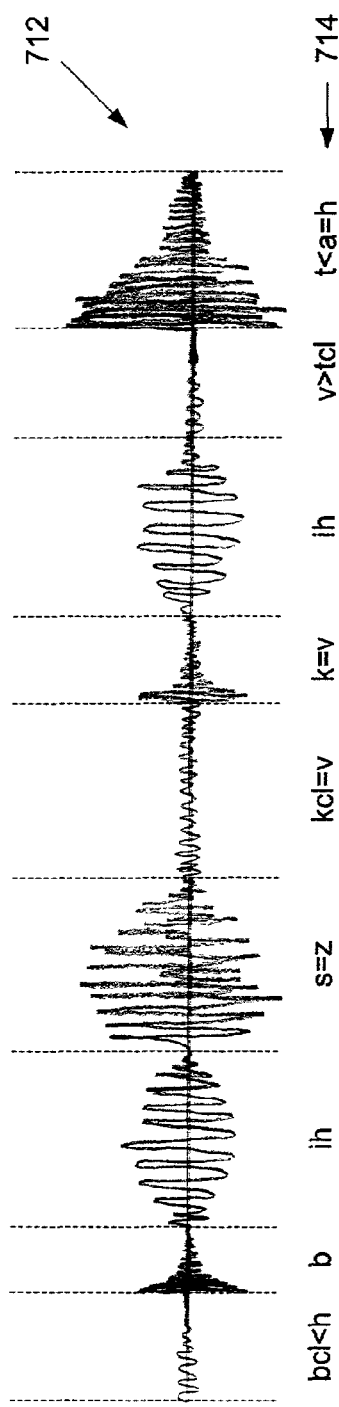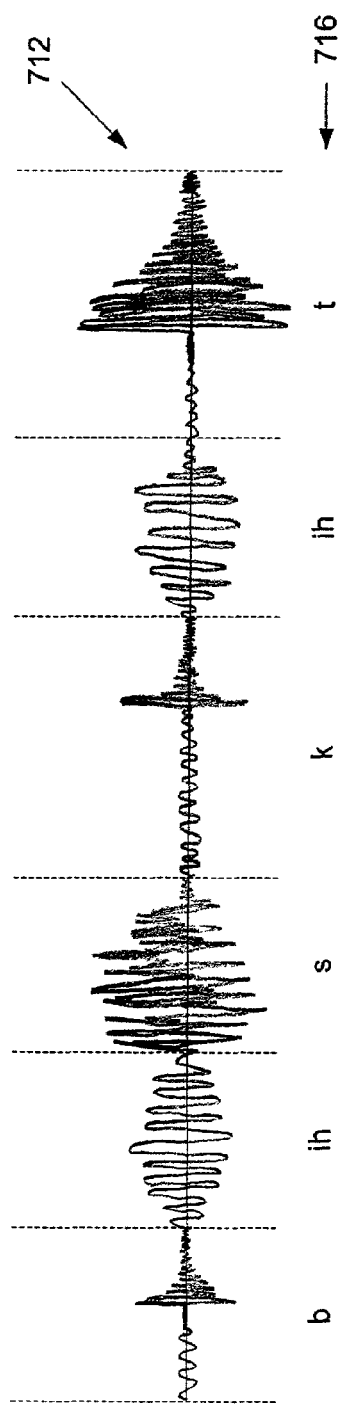
Fig. 7(a)
Fig. 7(b)

| Category | Base Phones | |
|---|---|---|
| Stops and Affricates | b d g p t k dx q jh ch | |
| Fricatives | s sh z zh f th v dh hh hv | 812 |
| Nasals | m n ng em en eng nx | |
| Semivowels and Glides | l r w y | |
| Diphthongs and Syllabics | ey aw ay oy ow er axr el | |
| Vowels | iy ih eh ae aa ah ao uh uw ux ax ix ax-h | |
| Silence, Closure, Pause | h# epi pau bcl dcl gcl pcl tcl kcl | |
| Stress | 1 2 | |
| | | |
| Variation of glottal stop | qq qh qcl qclq qqcl hqq hqh | |
| Multiple burst releases | pp tt kk bb dd gg jhjh chch | 814 |
| Closures of fricative consonants | fcl thcl scl shcl vcl dhcl zcl zhcl | |
| Vowel velarization/lateralization | al ol ul | |
| R-coloring | or ar ixr | |
| Glide loss | ee oo | |
| R-deletion | ax_ e_ ix_ ri ra | |
| Labio-velar fricative | hw | |
| Articulator noise | l# b# hh# w# g# ly# ll# lq# | |

| Acoustic-phonetic Process | Symbol |
|---|---|
| Nasalization | n |
| Glottalization variance | q qh hq qs |
| Breathiness | b |
| Labialization | w |
| Palatalization or whistle | y |
| Voicing | v |
| Devoicing | h |
| Voiced Frication | z |
| Voiceless Frication: low freq. | hh |
| Voiceless Frication: high freq. | s |
| Epenthetic Vowel | a |
| Murmur | m |
| Air Puff | p |
| Burst Quality | t |
| Approximation | c |
| No Burst/Release | u |
| Tongue click | x |

| | | |
|---|---|---|
| MERGE | bcl b : | b |
| MERGE | tcl t : | t |
| MERGE | kcl k : | k |
| SPLIT | em : | ah m |
| SPLIT | or : | ao r |
| SPLIT | al : | aa l |
| REPLACE | gg : | g |
| REPLACE | qclq : | q |
| SPLIT | aa=n : | aa n |
| REPLACE | p=v : | b |
| CHANGE IN CONTEXT | aa=n : | aa < n m ng |

SYSTEM AND METHOD FOR SPEECH RECOGNITION USING AN ENHANCED PHONE SET

CROSS-REFERENCE TO RELATED APPLICATION

This application is related to, and claims priority in, U.S. Provisional Application No. 60/125,890, entitled "A Method For Generating Phoneme Modeling Data For Speech Recognition," filed on Mar. 24, 1999. The related applications are commonly assigned.

BACKGROUND OF THE INVENTION

1. Field of the Invention

This invention relates generally to electronic speech recognition systems, and relates more particularly to a system and method for speech recognition using an enhanced phone set.

2. Description of the Background Art

Implementing an effective and efficient method for system users to interface with electronic devices is a significant consideration of system designers and manufacturers. Speech recognition is one promising technique that allows a system user to effectively communicate with selected electronic devices, such as digital computer systems. Speech typically consists of one or more spoken utterances that each may include a single word or a series of closely-spaced words forming a phrase or a sentence.

A common application of speech recognition systems is word processing programs that reproduce spoken words on a computer screen. In such an application, accurate recognition of speech is essential for user satisfaction. Other applications of speech recognition systems include speech-activated electronic systems that provide hands-free operation of various electronic devices.

The most useful and desirable speech recognition systems are those that are able to recognize speech from a wide variety of speakers. There is typically a wide range of speaking styles within a given language, including different dialects and accents of various geographical regions. These different speaking styles may pose difficulties for certain speech recognition systems.

Non-native speakers of a particular language may also pose significant difficulties for speech recognition systems. Certain sounds in a language may be very difficult for non-native speakers to produce, which in turn may increase the probability that a speech recognition system will not correctly identify the sounds as speech components. A speech recognition system that is trained to recognize only a relatively small number of sounds from a particular language may not be accurate enough to satisfy users who are non-native speakers.

Additional difficulties may arise when speakers have less than perfect enunciation. For example, a person may intend the words "want to," but actually say "wanna," which a speech recognition system may not recognize as an English language word. The human brain is typically effective at dealing with variations in speech to arrive at the speaker's intended meaning. Speech recognition systems, however, must be trained to recognize certain speech signal waveforms as elements of human speech. Therefore, implementing an effective and efficient method for system users to interface with electronic devices remains a significant consideration of system designers and manufacturers.

SUMMARY OF THE INVENTION

In accordance with the present invention, a system and method are disclosed for speech recognition using an enhanced phone set. In one embodiment, the invention includes speech data, an enhanced phone set, and a transcription generated by a transcription process. The transcription process selects appropriate phones from the enhanced phone set to represent acoustic-phonetic content of the speech data. A phone dataset includes the speech data and the transcription.

The present invention also includes a transformer that applies transformation rules to the phone dataset to produce a transformed phone dataset. The transformed phone dataset may then be utilized in training a speech recognizer, such as a Hidden Markov Model.

The enhanced phone set of the present invention includes base-phones and composite-phones. The enhanced base-phone set includes a significantly greater number of base-phones than the commonly used TIMIT base-phone set. Composite-phones are base-phones with attached acoustic-phonetic symbols that represent acoustic-phonetic processes that may affect the speech data. The acoustic-phonetic symbols are attached to base-phones with connectors that indicate how and where an acoustic-phonetic process affects the attached base-phone. Utilizing the enhanced phone set of the present invention results in a phone dataset that contains a highly-detailed representation of the acoustic-phonetic content of the speech data, including detailed content of acoustic-phonetic processes.

Various types of transformation rules may be applied to the phone dataset of the present invention to find the transformed phone dataset that is most effective for a particular speech recognizer. The transcription of the speech data need be performed only once, and different transformation rules may be applied as many times as necessary to produce a preferred transformed phone dataset for training the speech recognizer. The present invention thus flexibly and effectively implements a system and method for speech recognition using an enhanced phone set.

BRIEF DESCRIPTION OF THE DRAWINGS

FIG. 7(a) is an exemplary speech waveform and corresponding phones, according to one embodiment of the present invention;

FIG. 7(b) is an exemplary speech waveform and corresponding phones, according to one embodiment of the present invention;

FIG. 8(a) is a table for one embodiment of an extended base-phone set, according to the present invention;

FIG. 8(*b*) is a table for one embodiment of acoustic-phonetic processes, according to the present invention;

FIG. 9 is a table of exemplary transformation rules, according to one embodiment of the present invention.

DETAILED DESCRIPTION OF THE PREFERRED EMBODIMENT

The present invention relates to an improvement in speech recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes speech data, an enhanced phone set, and a transcription generated by a transcription process. The transcription process selects appropriate phones from the enhanced phone set to represent acoustic-phonetic content of the speech data. The enhanced phone set includes base-phones and composite-phones. A phone dataset includes the speech data and the transcription. The present invention also comprises a transformer that applies transformation rules to the phone dataset to produce a transformed phone dataset. The transformed phone dataset may be utilized in training a speech recognizer, such as a Hidden Markov Model. Various types of transformation rules may be applied to the phone dataset of the present invention to find an optimum transformed phone dataset for training a particular speech recognizer.

Figure 1:
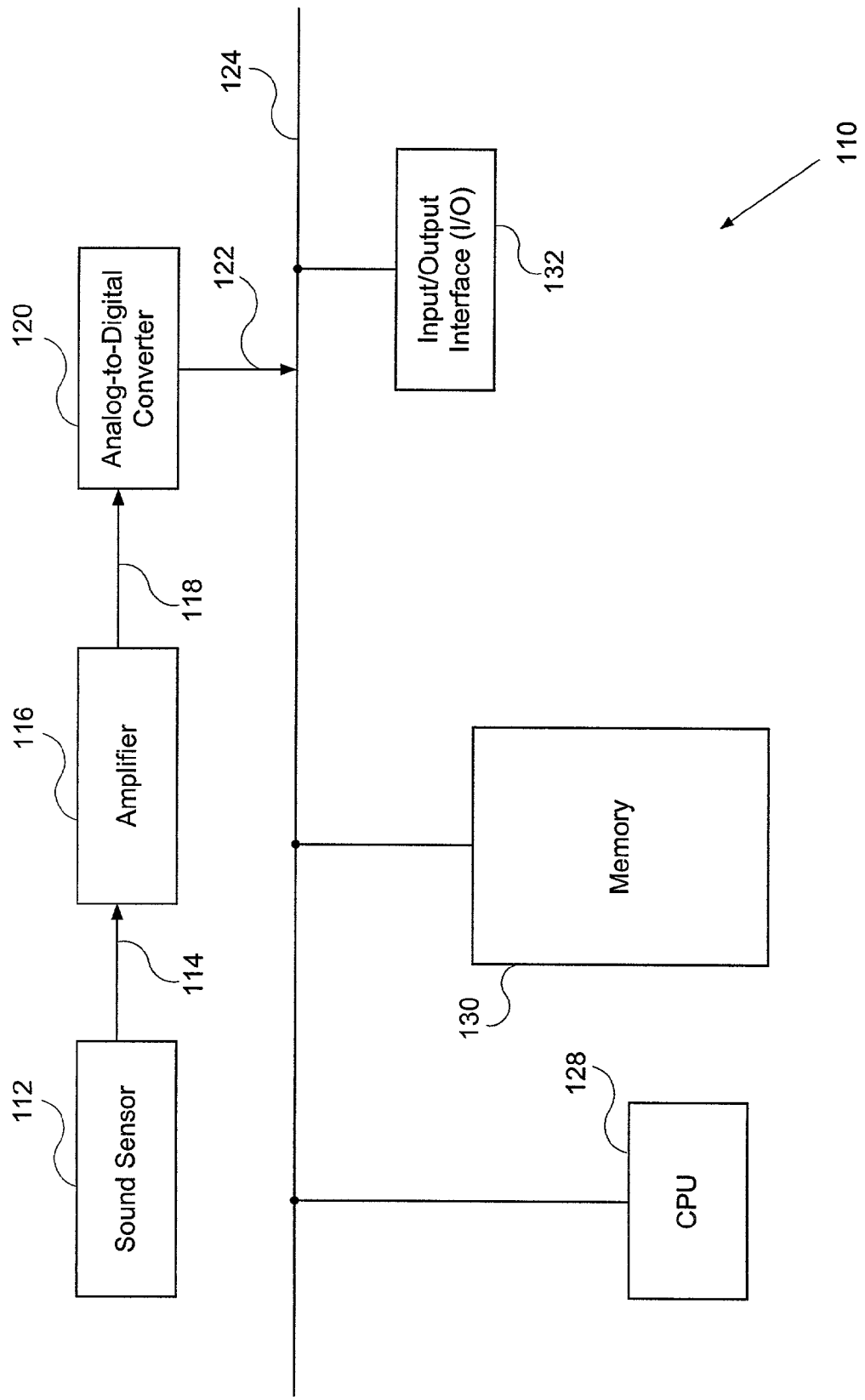
FIG. 1 is a block diagram for one embodiment of a computer system, according to the present invention.

Referring now to FIG. 1, a block diagram for one embodiment of a computer system 110 is shown, according to the present invention. The FIG. 1 embodiment includes, but is not limited to, a sound sensor 112, an amplifier 116, an analog-to-digital converter 120, a central processing unit (CPU) 128, a memory 130, and an input/output interface 132.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech recognition according to software instructions contained in memory 130. The operation of CPU 128 and the software instructions in memory 130 are further discussed below in conjunction with FIGS. 2–3. After the speech data is processed, CPU 128 may then provide the results of the speech recognition analysis to other devices (not shown) via input/output interface 132.

Figure 2:
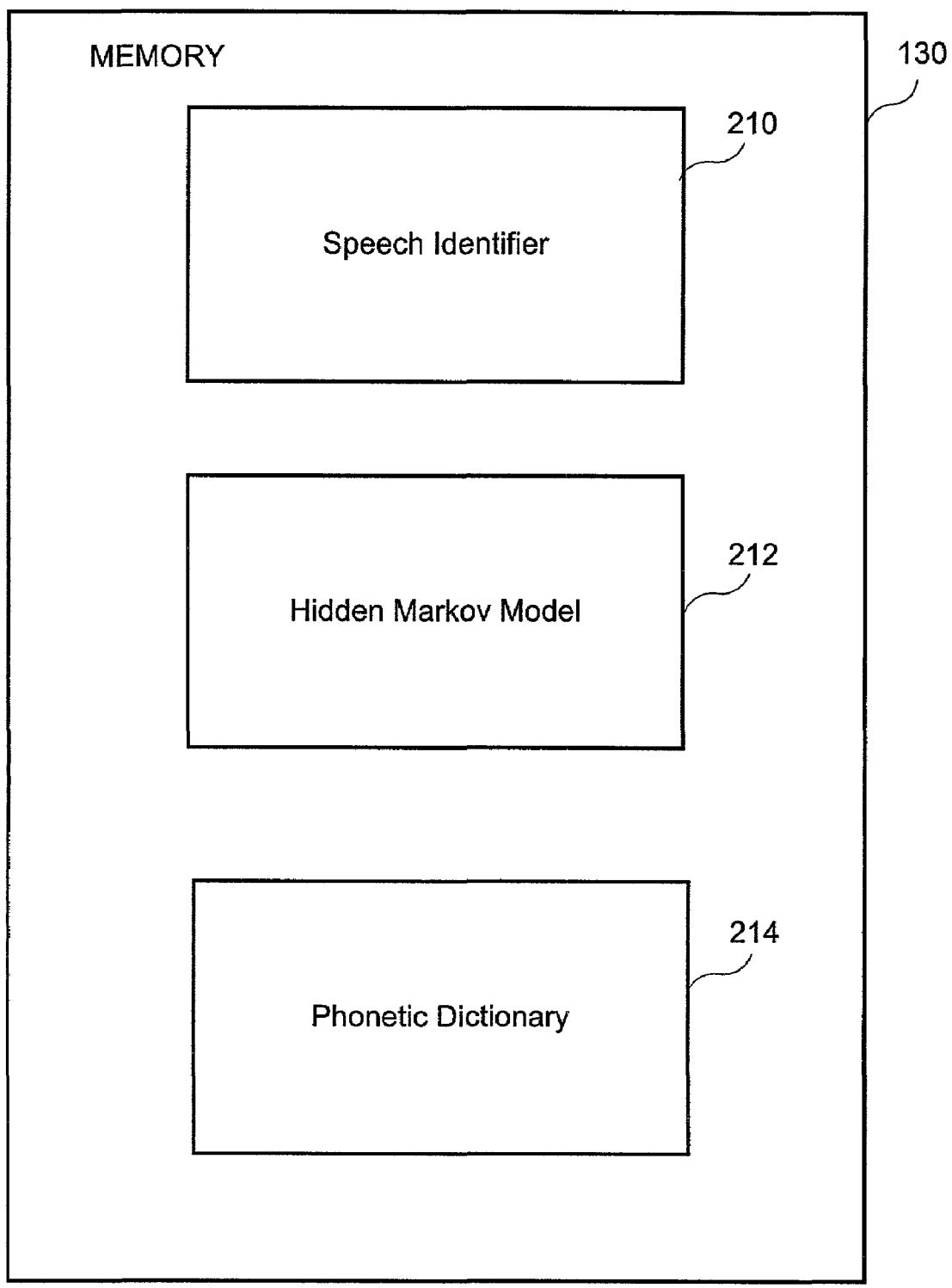
FIG. 2 is a block diagram for one embodiment of the memory of FIG. 1, according to the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech identifier 210, a Hidden Markov Model (HMM) 212, and a phonetic dictionary 214.

In the FIG. 2 embodiment, speech identifier 210 includes a series of software modules that are executed by CPU 128 to analyze and identify speech data, and which are further described below in conjunction with FIG. 3. In alternate embodiments, speech identifier 210 may readily be implemented using various other software and/or hardware configurations.

Hidden Markov Model (HMM) 212 is a speech recognizer that utilizes statistical learning techniques for speech recognition. The functionality of HMM 212 is further discussed below in conjunction with FIG. 3. Phonetic dictionary 214 preferably maps speech recognized by HMM 212 to corresponding words in the English language.

Figure 3:
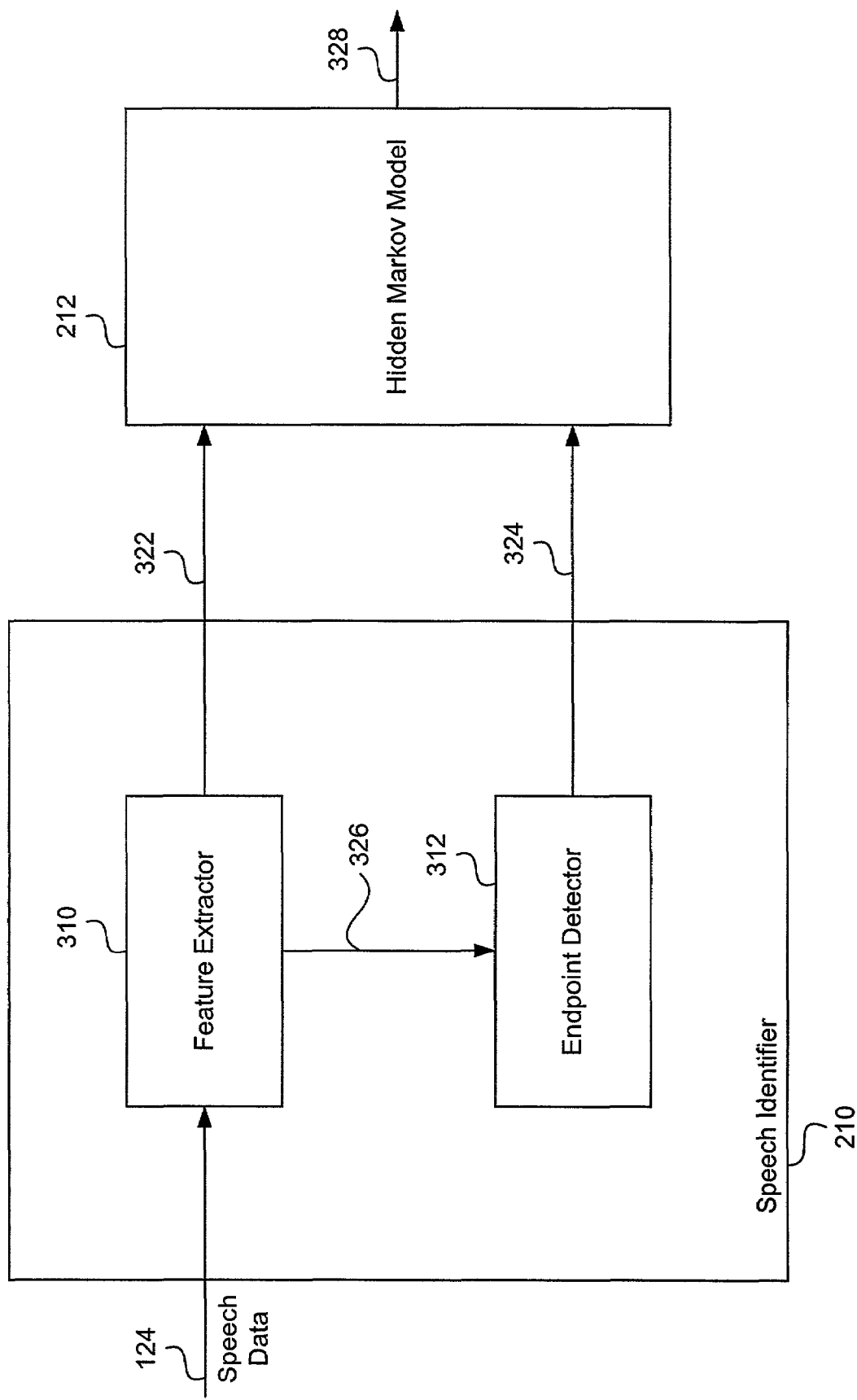
FIG. 3 is a block diagram for one embodiment of the speech identifier and the Hidden Markov Model of FIG. 2, according to the present invention.

Referring now to FIG. 3, a block diagram for one embodiment of the speech identifier 210 and the Hidden Markov Model 212 of FIG. 2 is shown, according to the present invention. Speech identifier 210 includes, but is not limited to, a feature extractor 310 and an endpoint detector 312.

Digital speech data from analog-to-digital converter 120 is input to feature extractor 310 via path 124. Feature extractor 310 responsively generates normalized feature vectors that are then provided to HMM 212 via path 322. Endpoint detector 312 analyzes sound data received from feature extractor 310 via path 326, and responsively determines endpoints (beginning and ending points) for spoken utterances represented by the sound data. Endpoint detector 312 then provides the calculated endpoints to HMM 212 via path 324.

HMM 212 utilizes the feature vectors and endpoint information to recognize speech. HMM 212 analyzes the feature vectors between endpoints to produce a series of phones, which are input to phonetic dictionary 214 via path 328. Phones, also known as phonemes or phone-like units (plu), represent basic sound units of a spoken language. HMM 212 is a software module executed by CPU 128 to match feature vectors from a portion of speech data to one of the phones.

HMM 212 must be trained in order to recognize speech. HMM 212 is typically trained by providing the software module with an example of speech data for each phone to be recognized. HMM 212 is typically trained using speech training data that includes predetermined speech tokens and phones that represent the acoustic-phonetic content of the speech tokens. This training data is produced during offline speech processing. Offline speech processing typically occurs during the manufacture of a speech recognition system. High-quality training data increases the accuracy and effectiveness of a speech recognizer. Thus, offline speech processing is an important aspect in the development and manufacturing of effective speech recognition systems.

Figure 4:
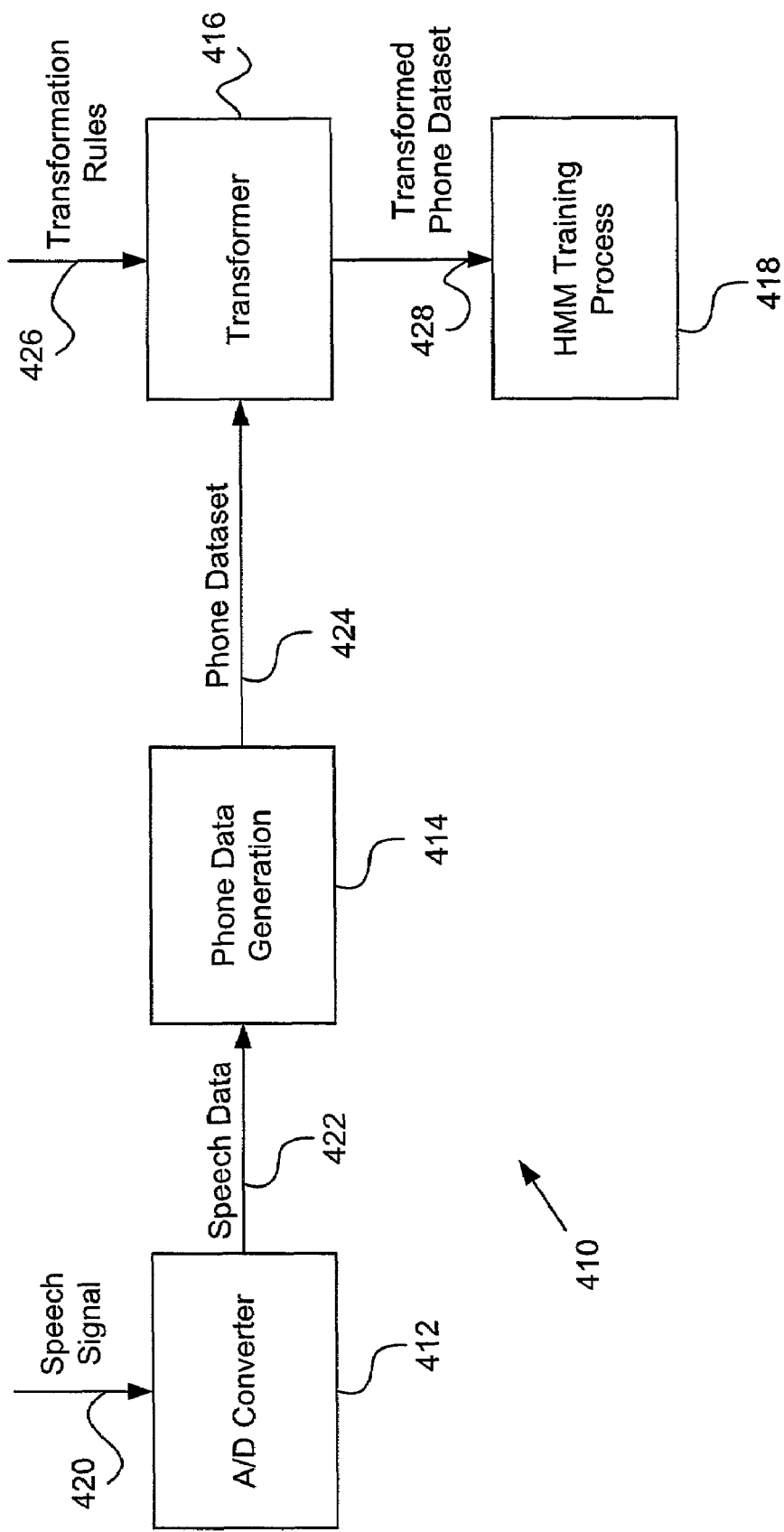
FIG. 4 is a block diagram for one embodiment of offline speech processing, according to the present invention.

Referring now to FIG. 4, a block diagram for one embodiment of offline speech processing 410 is shown, according to the present invention. In the FIG. 4 embodiment, offline speech processing 410 includes, but is not limited to, an analog-to-digital converter 412, a phone data generation 414, a transformer 416, and a HMM training process 418. An analog speech signal is input to analog-to-digital converter 412 via path 420. In one embodiment, the analog speech signal represents a number of predetermined words of American English. The number of predetermined words is preferably large, on the order of one hundred thousand words. The predetermined words are preferably spoken by a significant number of different speakers to provide a diverse sample of spoken American English.

Analog-to-digital converter 412 then converts the analog speech signal into digital speech data. The digital speech data is then input to phone data generation 414 via path 422. Phone data generation 414 preferably produces a phone dataset that is output to transformer 416 via path 424. The phone dataset preferably includes the speech tokens and phones that represent the acoustic-phonetic content of the speech tokens. The phone dataset is preferably embodied in the form of a database, and may be stored in various types of storage media, such as floppy discs, compact discs, or hard disc drives. The contents and functionality of phone data generation 414 are further discussed below in conjunction with FIGS. 5–8.

Transformer 416 preferably applies transformation rules to the phone dataset to produce a transformed phone dataset. In the FIG. 4 embodiment, transformer 416 is a software module executed by a processor in a general-purpose computer system (not shown). In alternate embodiments, transformer 416 may readily be implemented using various other software and/or hardware configurations.

Various transformation rules may be applied to the phone dataset to create different transformed phone datasets. A transformed phone dataset may be produced to meet the needs of a particular speech recognition application. Transformation rules are further discussed below in conjunction with FIG. 9.

The transformed phone dataset is output to HMM training process 418 via path 428. HMM training process 418 preferably utilizes the transformed phone dataset to produce a HMM 212 for a particular speech recognition application. HMM training process 418 typically creates a software model for each phone in the transformed phone dataset, and then each model is taught which speech data correspond to the model's phone using statistical learning techniques.

Figure 5:
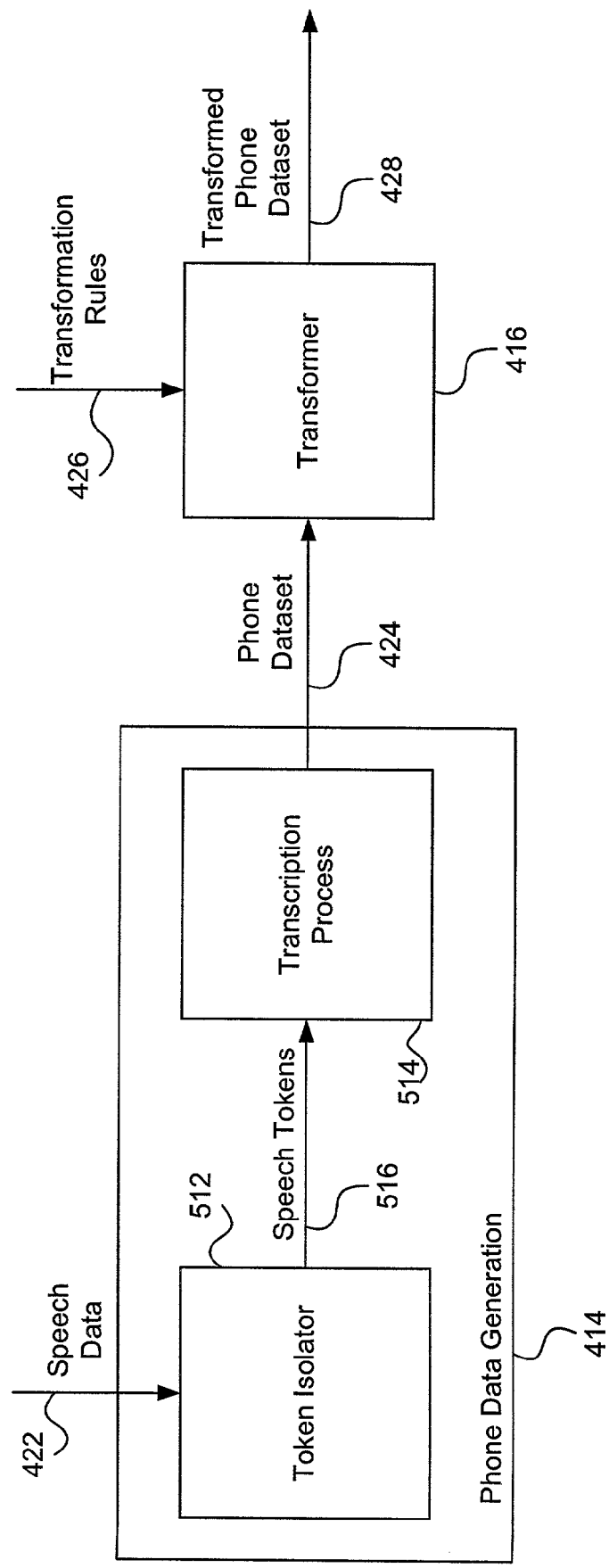
FIG. 5 is a block diagram for one embodiment of the phone data generation and the transformer of FIG. 4, according to the present invention.

Referring now to FIG. 5, a block diagram for one embodiment of the phone data generation 414 and the transformer 416 of FIG. 4 is shown, according to the present invention. Phone data generation 414 includes, but is not limited to, a token isolator 512 and a transcription process 514. The FIG. 5 embodiment of token isolator 512 is preferably a software module that receives the digital speech data via path 422, and isolates each word or speech token from any intervening silences. The speech tokens are then output to transcription process 514 via path 516.

Transcription process 514 generates a transcription of the speech tokens by matching the digital speech data of the tokens with appropriate corresponding phones from an enhanced phone set. In the FIG. 5 embodiment, transcription process 514 preferably utilizes an enhanced phone set for the American English language, however, enhanced phone sets for other languages are within the scope of the present invention. Each speech token is assigned a group of phones that represents the acoustic-phonetic content of the token. The enhanced phone set of the present invention is further discussed below in conjunction with FIGS. 6–8.

In the preferred embodiment of the present invention, transcription process 514 includes an individual who manually transcribes the speech tokens. The individual typically listens to an audio playback of each speech token, views the corresponding speech token waveform using an oscilloscope, views the frequency spectrum using a spectrum analyzer, and then assigns appropriate phones to the speech token. The individual is preferably a person skilled in the art of speech transcription. In another embodiment of the present invention, transcription process 514 may be an automatic transcription process that is programmed to assign an appropriate group of phones to each speech token.

Figure 6:
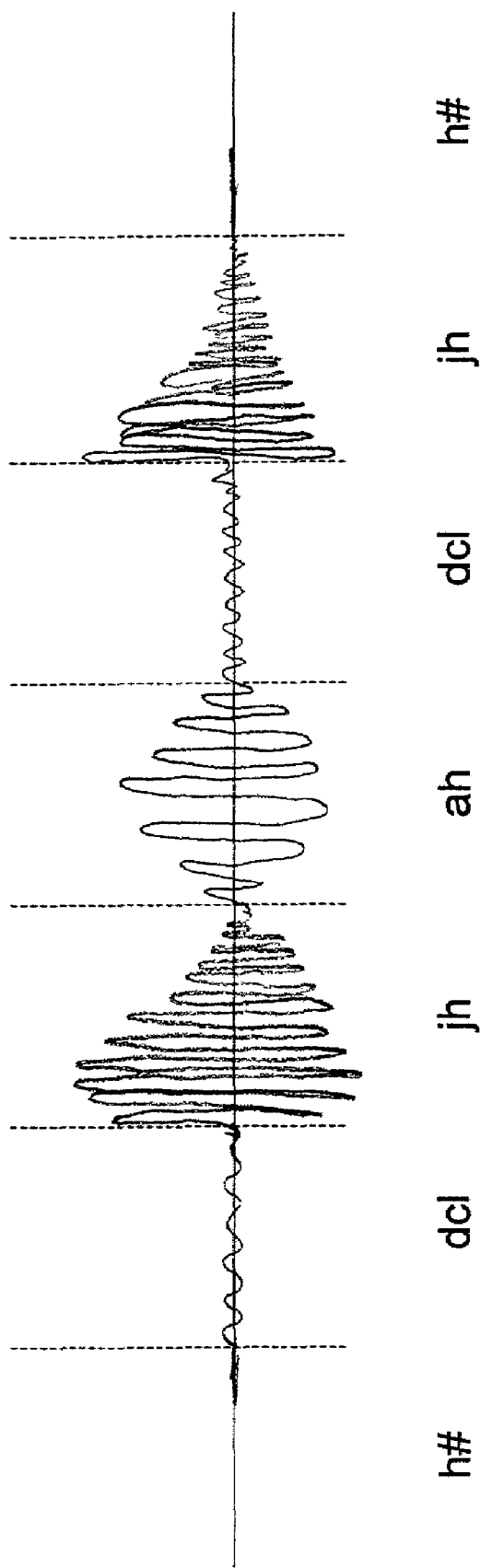
FIG. 6 is an exemplary speech waveform and corresponding phones, according to one embodiment of the present invention.

Referring now to FIG. 6, an exemplary speech waveform and corresponding phones are shown, according to one embodiment of the present invention. The speech token in FIG. 6 represents the word "judge." The corresponding phones include a silence (h#) at each end, and intervening phones, in this example base-phones, representing the phonetic components of the token. Each phonetic component of the token has a particular signal shape. However, different speakers typically produce different, yet similarly, shaped speech signals for the same word. In addition, one speaker may produce differently shaped signals for the same base-phone. For example, as shown in FIG. 6, the first /jh/ base-phone signal has a slightly different shape from the second /jh/ base-phone signal.

The accuracy of transcription process 514 depends heavily on the phone set that transcription process 514 utilizes when assigning phones to a speech token. If a particular section of a speech token does not exactly match the waveform of a phone in the phone set, then transcription process 514 must assign a phone that most closely matches the speech waveform. If none of the phones in the phone set closely matches the speech waveform, then transcription process 514 may make an arbitrary selection of a phone to represent the acoustic-phonetic content of the speech token. This approximation of what the speech token actually represents during offline speech processing may degrade the speech recognition performance of HMM 212.

Since there are various ways in which different speakers may pronounce the same word, a commonly-used phone set (for instance, the TIMIT base-phone set) may not be adequate to completely describe the actual acoustic-phonetic content of a speech token. The present invention comprises an enhanced phone set that includes a larger number of base-phones than the commonly-used TIMIT base-phone set. The enhanced phone set of the present invention also allows use of additional symbols to describe more complex acoustic-phonetic characteristics of the base-phones. These additional symbols are connected to base-phones to produce composite-phones. Thus, the resulting phone dataset from transcription process 514 is a more detailed, accurate, and complete description of the acoustic-phonetic content of the speech tokens.

Referring now to FIG. 7(a), an exemplary speech waveform and corresponding phones are shown, according to one embodiment of the present invention. FIG. 7(a) shows a speech token waveform 712 for the word "biscuit." Speech token 712 has been transcribed to produce a transcription 714. Transcription 714 contains nine separate phones. Transcription 714 contains base-phones /b/ and /ih/, and composite-phones /bcl<h/, /s=z/, /kcl=v/, /k=v/, /v>tcl/, and /t<a=h/. The composite-phones of transcription 714 are base-phones with attached acoustic-phonetic symbols. Acoustic-phonetic symbols are further discussed below in conjunction with FIG. 8(b).

Transcription 714 captures many details of the acoustic-phonetic content of speech token 712. Composite-phone /bcl<h/ represents a b-closure with devoicing at the end of the phone. Composite-phone /s=z/ represents an s-fricative with voiced frication (hissing sound) affecting the entire phone. Composite-phone /kcl=v/ represents a k-closure that is completely voiced, and composite-phone /k=v/ represents a k-stop that is completely voiced. Composite-phone /v>tcl/ represents a t-closure that is voiced at the beginning of the base-phone. Composite-phone /t<a=h/ represents a t-stop with an epenthetic vowel process affecting the end of the base-phone with complete devoicing.

A highly-detailed transcription of a speech token during offline speech processing allows a designer of speech recognition systems greater flexibility in the design process. If the transcription of speech data is very detailed, the resulting phone dataset will contain a great deal of information. The phone dataset may then be transformed in various ways using transformation rules. Different transformation rules may be applied to the phone dataset until a designer achieves the transformed phone dataset that is most effective for a particular speech recognition application.

For example, a word-processing application may convert speech into text on a screen. If only native English speakers will be using the application, then the phone dataset used to train the speech recognizer may only need to contain 60 phones. However, if the application will also be used by non-native English speakers, then the phone dataset used to train the speech recognizer may need to contain a significantly larger number of phones to perform effectively. The phone dataset of the present invention advantageously may be transformed to produce a transformed phone dataset for native speakers and transformed to produce a transformed phone dataset for non-native speakers.

Referring now to FIG. 7(b), the speech waveform 712 of FIG. 7(a) and a transformed set of phones 716 is shown, according to one embodiment of the present invention. Transcription 714 has been transformed to produce transformed set of phones 716. Transformed set of phones 716 includes base-phones only. Transcription 714 has been transformed by applying transformation rules that replace composite-phones with base-phones, and transformation rules that merge closures (/bcl/, /kcl/, /tcl/) into their associated base-phones (/b/, /k/, /t/). Transformed set of phones 716 is not necessarily an incorrect representation of the acoustic-phonetic content of speech token 712, but rather represents a different level of detail of speech token 712.

Referring now to FIG. 8(a), a table for one embodiment of an extended base-phone set 810 is shown, according to the present invention. The FIG. 8(a) embodiment of extended base-phone set 810 of the present invention includes a subset 812 and a subset 814. Subset 812 includes the commonly-used TIMIT base-phone set. The TIMIT base-phone set includes base-phones that represent stops and affricates, fricatives, nasals, semivowels and glides, diphthongs and syllabics, vowels, silence, closure, pause, and stress. The TIMIT speech corpus database is available on CD-ROM from the National Technical Information Service (www.ntis.gov).

Subset 814 includes additional base-phones to more accurately and completely describe the acoustic-phonetic content of speech tokens. The additional base-phones of subset 814 allow transcription process 514 to more completely describe phones that have great variability in pronunciation. A glottal stop is a speech sound typically articulated by a momentary, complete closing of the glottis in the back of the throat. However, the glottal stop has a large amount of variability at the acoustic-phonetic level. For example, a glottal stop may contain two pulses /qq/, a pulse may be followed by devoicing /qh/, or a closure may be bounded by two pulses /qclq/. Extended base-phone set 810 of the present invention preferably includes eight base-phones for the glottal stop, which allows transcription process 514 to more accurately describe the acoustic-phonetic content of speech tokens.

In addition, extended base-phone set 810 includes eight base-phones for closures of fricative consonants, which are not accounted for in the TIMIT base-phone set. Extended base-phone set 810 also allows transcription process 514 to describe R-coloring of vowels, in which a slight r-sound is added to the production of a vowel, and velarization of vowels, in which a slight l-sound is added to the production of a vowel. Extended base-phone set 810 also includes phones that describe glide loss, in which the second component of a diphthong is not produced. Examples of a glide loss are when the base-phone /ey/ loses its second component, which is symbolized by the base-phone /ee/, and when the base-phone /ow/ loses its second component, which is symbolized by the base-phone /oo/.

Base-phones representing R-deletion are also included in extended base-phone set 810. R-deletion is where an expected r-sound is not produced and may be represented by base-phones /ax_/, /e_/, and /ix_/, where the underscore represents the position of the missing r-sound. R-deletion may also occur where a final r-sound of a word is pronounced more like a schwa, and may be represented by base-phone /ri/ for high R-deletion and by base-phone /ra/ for lower R-deletion. Base-phones that represent multiple burst releases are also included in extended base-phone set 810. Multiple burst releases of stops /p/, /t/, /k/, /b/, /d/, /g/, /jh/, and /ch/ are represented by the base-phones /pp/, /tt/, /kk/, /bb/, /dd/, /gg/, /jhjh/, and /chch/ respectively. A labio-velar fricative is represented by the base-phone /hw/.

Additionally, extended base-phone set 810 includes base-phones to represent various types of articulator noise. Articulator noise is noise caused by the mouth, typically by the tongue and lips. The base-phone /l#/ represents a tongue click, the base-phone /b#/ represents breathing, the base-phone /hh#/ represents low amplitude noise of unclear origin, and the base-phone /w#/ represents whistling. The base-phone /g#/ represents guttural or throat noise, the base-phone /ly#/ represents a yawn, the base-phone /ll#/ represents laughter, and the base-phone /lq#/ represents a glottal squeak. Thus extended base-phone set 810 may be utilized in transcription process 514 to advantageously describe and account for many non-speech sounds which may be present in the speech data.

Referring now to FIG. 8(b), a table for one embodiment of acoustic-phonetic processes 816 is shown, according to the present invention. Other embodiments of acoustic-phonetic processes may contain a greater or lesser number of acoustic-phonetic processes, and may be represented by symbols other than letters. Acoustic-phonetic processes 816 are used with connectors to describe the acoustic-phonetic content of speech tokens in even further detail. The connectors preferably indicate whether the connected acoustic-phonetic process occurs at the beginning, at the end, or during production of the entire phone. A base-phone having connected acoustic-phonetic symbols is referred to as a composite-phone.

Acoustic-phonetic processes 816 include symbols for nasalization (air escapes from the nose), labialization (lip-rounding), palatalization or whistle (tongue close to the hard palate), and breathiness (air passing through slightly open glottis). Glottalization variance (momentary closure of the glottis) may be represented by one of four symbols. The symbol "q" represents a single glottal pulse, the symbol "qh" represents a glottal pulse followed by devoicing, the symbol "hq" represents devoicing followed by a glottal pulse, and the symbol "qs" represents a glottal squeak.

Acoustic-phonetic symbols for voicing (vibration of vocal cords) and devoicing (no vibration of vocal cords) are included, as well as symbols for voiced frication (hissing sound with vibration of vocal cords) and voiceless frication (hissing sound without vibration of vocal cords). A low frequency voiceless frication is represented by the symbol "hh," and a high frequency voiceless frication is represented by the symbol "s." Epenthetic vowels, which are extra vowel sounds typically inserted after a consonant for emphasis, are represented by attaching the symbol "a" to the affected base-phone.

Acoustic-phonetic processes 816 further include symbols for murmur (voiced sound fades away), air puff, burst quality (unexpected inserted consonant), approximation, no burst or release of a stop, and tongue click.

In the FIG. 8(*b*) embodiment, the connectors of the present invention preferably include the characters greater than ">," less than "<," equals "=" and the carat "^." The greater than ">" connector may be placed to the left of a base-phone to indicate that the connected acoustic-phonetic process occurred at the beginning of the production of the phone. The less than "<" connector may be placed to the right of a base-phone to indicate that the connected acoustic-phonetic process occurred at the end of the production of the phone. Thus the position of the connected acoustic-phonetic symbol advantageously indicates where the acoustic-phonetic process affects the composite-phone.

The equals "=" connector may be placed to the right of a base-phone to indicate that the connected acoustic-phonetic process modified the production of the base-phone in its entirety. The carat "^" connector may be placed to the right of a base-phone to indicate that the connected acoustic-phonetic process occurred completely within the left-to-right bounds of the phone. The carat connector typically indicates an acoustic-phonetic process that is briefer than an acoustic-phonetic process that merits use of the equals connector. Other appropriate connectors may be used to capture acoustic-phonetic processes that may affect base-phones.

The connectors of the present invention may advantageously be used in combination to describe multiple acoustic-phonetic processes that may affect a base-phone. For example, let P represent an arbitrary base-phone. If X and Y represent different arbitrary acoustic-phonetic processes, then acoustic-phonetic processes X and Y affecting base-phone P may be represented as composite-phones X>P<Y, X>P<Y<X, or P=Y^X. Thus, the connectors and acoustic-phonetic symbols of the present invention in combination with extended base-phone set 810 of the present invention produce an enhanced phone set that may be used to describe completely and accurately acoustic-phonetic content of speech tokens.

Referring now to FIG. 9, a table of exemplary transformation rules 912 is shown, according to one embodiment of the present invention. Transformation rules 912 are preferably embodied in a software module that may be stored on a floppy disc, compact disc, hard disc drive or other storage medium. Other embodiments of transformation rules may include a greater or lesser number of rules, and the rules may be of different types. In the FIG. 9 embodiment, transformation rules 912 are of four types: merge, split, replace, and change in context. Transformation rules 912 are applied to the phone dataset to create a transformed phone dataset that may be used to train a particular HMM 212 in a speech recognition system.

The merge-type transformation rules preferably reduce the number of phones in the dataset by combining two adjacent phones into one phone. An example of a merge-type transformation is shown in FIGS. 7(*a*) and (*b*), where the voiced closure /kcl=v/ is merged into its associated base-phone /k/. The split-type transformation rules preferably increase the number of phones in the dataset by separating one phone into two phones, for example splitting base-phone /em/ into base-phones /ah/ and /m/. A split-type transformation rule may also split one composite-phone into two base-phones, for example splitting composite-phone /aa=n/ into base-phones /aa/ and /n/.

The replace-type transformation rules preferably replace one phone for a different, perhaps more common phone, for example replacing multiple burst base-phone /gg/ with base-phone /g/. A replace-type transformation rule may also replace one composite-phone with a single base-phone, for example replacing composite-phone /p=v/ with base-phone /b/. An example of a replace-type transformation is shown in FIGS. 7(*a*) and (*b*), where composite-phone /s=z/ is replaced by base-phone /s/.

The change in context-type transformation rules change one phone for another depending on context. In FIG. 9, the change in context rule states that the composite-phone /aa=n/ (base-phone /aa/ with nasalization) is to be changed to the base-phone /aa/ when the composite-phone /aa=n/ is followed by base-phones /n/, /m/, or /ng/ in the speech token. Change in context-type transformation rules may require a phone to change depending on preceding phones, following phones, or both. Other types of transformation rules are within the scope of the present invention.

According to the present invention, utilizing an enhanced phone set, including extended base-phone set 810 and acoustic-phonetic processes 816, in the transcription process advantageously allows for great flexibility in designing and implementing transformation rules. Transcription process 514 need only be performed once and different sets of transformation rules applied to the phone dataset to produce an optimum transformed phone dataset for training a specific HMM 212.

Figure 10:
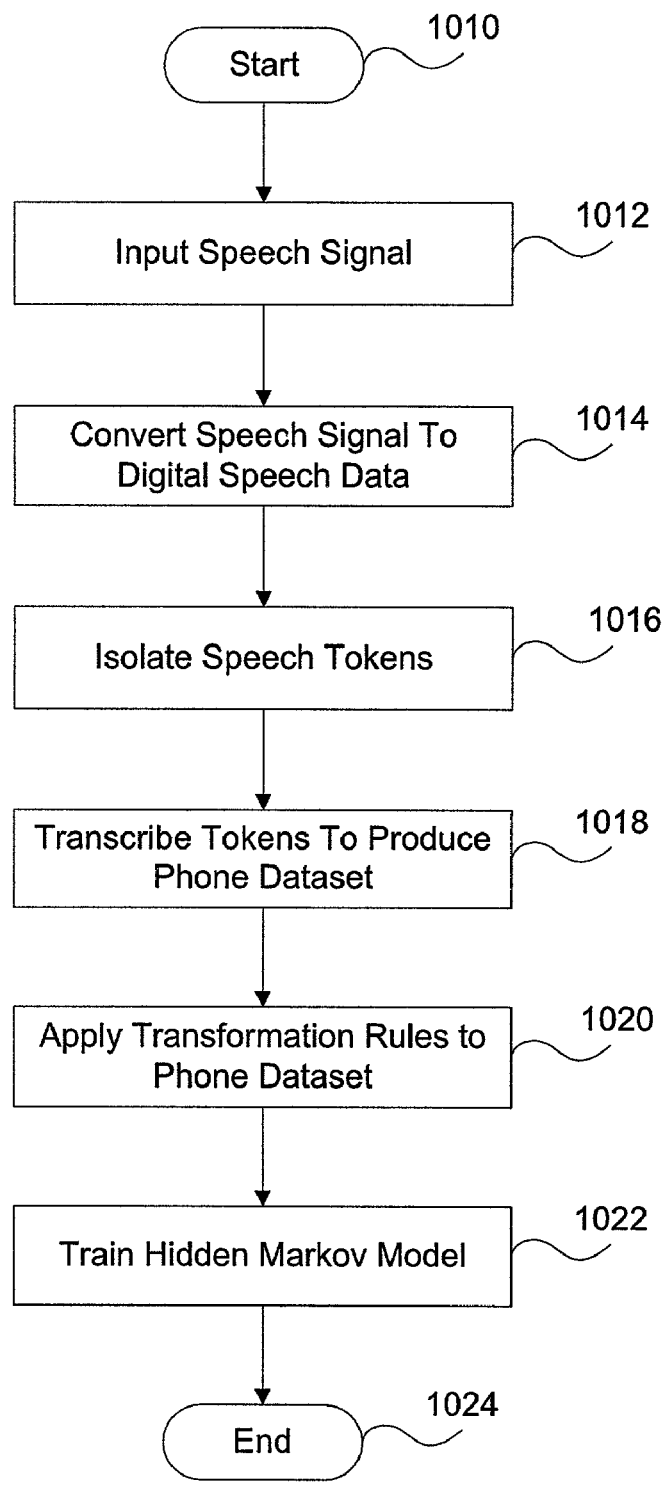
FIG. 10 is a flowchart of method steps for offline speech processing, according to one embodiment of the present invention.

Referring now to FIG. 10, a flowchart of method steps for offline speech processing is shown, according to one embodiment of the present invention. Initially, in step 1012, a predetermined analog speech signal is input to offline speech processing 410. In step 1014, analog-to-digital converter 412 preferably converts the analog speech signal into digital speech data. Then, in step 1016, token isolator 512 preferably isolates speech tokens from any intervening silences in the digital speech data.

In step 1018, transcription process 514 preferably produces a phone dataset by transcribing the speech tokens into corresponding phones including any pertinent acoustic-phonetic events. Transcription process 514 preferably utilizes an enhanced phone set that includes extended base-phone set 810 and acoustic-phonetic processes 816 to represent the acoustic-phonetic content of the speech tokens. Acoustic-phonetic symbols 816 are preferably attached with connectors (>, <, =, ^), as described above in conjunction with FIG. 8(*b*), to indicate how and where a pertinent acoustic-phonetic process affects an attached base-phone.

Then, in step 1020, transformer 416 preferably applies transformation rules to the phone dataset to produce a transformed phone dataset. Various sets of transformation rules may be applied to the phone dataset to produce various transformed phone datasets. Each transformed phone dataset may then be tested in order to identify an optimum transformed phone dataset for a specific speech recognition application. Finally, in step 1022, the transformed phone dataset is used to train a Hidden Markov Model 212 to recognize speech, as described above in conjunction with FIG. 4.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for speech processing, comprising:
   speech data generated from one or more speech sources;
   an enhanced phone set that includes acoustic-phonetic symbols and connectors for extending said enhanced phone set, said enhanced phone set including a TIMIT base-phone set and an extended base-phone set, said extended base-phone set including a base phone for representing an articulator noise;
   a transcription generated by a transcription process that selects appropriate phones from said enhanced phone set to represent said speech data; and
   transformation rules applied to said enhanced phone set to produce a transformed phone dataset, said transformed phone dataset being used in building a phonetic dictionary.

2. The system of claim 1, further comprising a phone dataset that includes said speech data and said transcription.

3. The system of claim 2, wherein said phone dataset is utilized in training a speech recognizer.

4. The system of claim 2, wherein said phone dataset is utilized in building a phonetic dictionary.

5. The system of claim 2, wherein said transformation rules are applied to said phone dataset to produce said transformed phone dataset, said transformed phone dataset being for use in training a speech recognizer.

6. The system of claim 5, wherein said transformation rules include merge-type transformation rules that combine two adjacent phones in said phone dataset into a single phone selected from said enhanced phone set.

7. The system of claim 5, wherein said transformation rules include split-type transformation rules that separate one phone in said phone dataset into two different phones selected from said enhanced phone set.

8. The system of claim 5, wherein said transformation rules include replace-type transformation rules that replace one phone in said phone dataset with a different phone selected from said enhanced phone set.

9. The system of claim 5, wherein said transformation rules include change in context-type transformation rules that change one phone in said phone dataset to a different phone selected from said enhanced phone set depending on context.

10. The system of claim 1, wherein said enhanced phone set includes said acoustic-phonetic symbols, said acoustic-phonetic symbols being utilized in said transcription process to represent acoustic-phonetic processes of said speech data.

11. The system of claim 10, wherein said enhanced phone set further includes said connectors used in said transcription process to connect said acoustic-phonetic symbols to base-phones affected by acoustic-phonetic processes, thereby producing composite-phones.

12. The system of claim 11, wherein said connectors indicate how and where said acoustic-phonetic processes affect said base-phones.

13. The system of claim 12, wherein said connectors include a character ">" that is placed to the left of one of said base-phones to indicate that one of said acoustic-phonetic processes affects a beginning of said one of said base-phones.

14. The system of claim 13, wherein said character ">" is placed to the left of one of said composite-phones to indicate that one of said acoustic-phonetic processes affects a beginning of said one of said composite-phones.

15. The system of claim 12, wherein said connectors include a character "<" that is placed to the right of one of said base-phones to indicate that one of said acoustic-phonetic processes affects an ending of said one of said base-phones.

16. The system of claim 15, wherein said character "<" is placed to the right of one of said composite-phones to indicate that one of said acoustic-phonetic processes affects an ending of said one of said composite-phones.

17. The system of claim 12, wherein said connectors include a character "=" that is placed to the right of one of said base-phones to indicate that one of said acoustic-phonetic processes affects an entirety of said one of said base-phones.

18. The system of claim 17, wherein said character "=" is placed to the right of one of said composite-phones to indicate that one of said acoustic-phonetic processes affects an entirety of said one of said composite-phones.

19. The system of claim 12, wherein said connectors include a character "^" that is placed to the right of one of said base-phones to indicate that one of said acoustic-phonetic processes occurred completely within said one of said base-phones.

20. The system of claim 19, wherein said character "^" is placed to the right of one of said composite-phones to indicate that one of said acoustic-phonetic processes occurred completely within said one of said composite-phones.

21. A system for speech processing, comprising:
    speech data generated from one or more speech sources;
    an enhanced phone set that includes acoustic-phonetic symbols and connectors for extending said enhanced phone set, said enhanced phone set including a TIMIT base-phone set and an extended base-phone set;
    a transcription generated by a transcription process that selects appropriate phones from said enhanced phone set to represent said speech data, said acoustic-phonetic symbols being utilized in said transcription process to represent acoustic-phonetic processes of said speech data, said acoustic-phonetic processes represented by said acoustic-phonetic symbols including an epenthetic vowel; and
    transformation rules applied to said enhanced phone set to produce a transformed phone dataset, said transformed phone dataset being used in building a phonetic dictionary.

22. A method for speech processing, comprising:
    generating speech data from one or more speech sources;
    providing an enhanced phone set that includes acoustic-phonetic symbols and connectors for extending said enhanced phone set, said enhanced phone set including a TIMIT base-phone set and an extended base-phone set, said extended base-phone set including a base phone for representing an articulator noise;
    producing a transcription using a transcription process that selects appropriate phones from said enhanced phone set to represent said speech data; and applying transformation rules to said enhanced phone set to produce a transformed phone dataset, said transformed phone dataset being used in building a phonetic dictionary.

23. The method of claim 22, further comprising the step of combining said speech data and said transcription to produce a phone dataset.

24. The method of claim 23, wherein said phone dataset is utilized in training a speech recognizer.

25. The method of claim 23, wherein said phone dataset is utilized in building a phonetic dictionary.

26. The method of claim 23, further comprising the step of applying said transformation rules to said phone dataset to produce said transformed phone dataset, said transformed phone dataset being for use in training a speech recognizer.

27. The method of claim 26, wherein said transformation rules include merge-type transformation rules that combine two adjacent phones in said phone dataset into a single phone selected from said enhanced phone set.

28. The method of claim 26, wherein said transformation rules include split-type transformation rules that separate one phone in said phone dataset into two different phones selected from said enhanced phone set.

29. The method of claim 26, wherein said transformation rules include replace-type transformation rules that replace one phone in said phone dataset with a different phone selected from said enhanced phone set.

30. The method of claim 26, wherein said transformation rules include change in context-type transformation rules that change one phone in said phone dataset to a different phone selected from said enhanced phone set depending on context.

31. The method of claim 22, wherein said enhanced phone set includes said acoustic-phonetic symbols, said acoustic-phonetic symbols being utilized in said transcription process to represent acoustic-phonetic processes of said speech data.

32. The method of claim 31, wherein said enhanced phone set further includes said connectors used in said transcription process to connect said acoustic-phonetic symbols to base-phones affected by acoustic-phonetic processes, thereby producing composite-phones.

33. The method of claim 32, wherein said connectors indicate how and where said acoustic-phonetic processes affect said base-phones.

34. The method of claim 33, wherein said connectors include a character ">" that is placed to the left of one of said base-phones to indicate that one of said acoustic-phonetic processes affects a beginning of said one of said base-phones.

35. The method of claim 34, wherein said character ">" is placed to the left of one of said composite-phones to indicate that one of said acoustic-phonetic processes affects a beginning of said one of said composite-phones.

36. The method of claim 33, wherein said connectors include a character "<" that is placed to the right of one of said base-phones to indicate that one of said acoustic-phonetic processes affects an ending of said one of said base-phones.

37. The method of claim 36, wherein said character "<" is placed to the right of one of said composite-phones to indicate that one of said acoustic-phonetic processes affects an ending of said one of said composite-phones.

38. The method of claim 33, wherein said connectors include a character "=" that is placed to the right of one of said base-phones to indicate that one of said acoustic-phonetic processes affects an entirety of said one of said base-phones.

39. The method of claim 38, wherein said character "=" is placed to the right of one of said composite-phones to indicate that one of said acoustic-phonetic processes affects an entirety of said one of said composite-phones.

40. The method of claim 33, wherein said connectors include a character "^" that is placed to the right of one of said base-phones to indicate that one of said acoustic-phonetic processes occurred completely within said one of said base-phones.

41. The method of claim 40, wherein said character "^" is placed to the right of one of said composite-phones to indicate that one of said acoustic-phonetic processes occurred completely within said one of said composite-phones.

42. A method for speech processing, comprising:
generating speech data from one or more speech sources;
providing an enhanced phone set that includes acoustic-phonetic symbols and connectors for extending said enhanced phone set, said enhanced phone set including a TIMIT base-phone set and an extended base-phone set;
producing a transcription using a transcription process that selects appropriate phones from said enhanced phone set to represent said speech data, said acoustic-phonetic symbols being utilized in said transcription process to represent acoustic-phonetic processes of said speech data, said acoustic-phonetic processes represented by said acoustic-phonetic symbols including an epenthetic vowel; and
applying transformation rules to said enhanced phone set to produce a transformed phone dataset, said transformed phone dataset being used in building a phonetic dictionary.

43. A method for speech processing, comprising:
providing an enhanced phone set that includes enhanced base-phones for representing input speech data, acoustic-phonetic symbols that represent acoustic-phonetic content of said input speech data, and connectors for extending said enhanced base-phones by selectively connecting said acoustic-phonetic symbols to said enhanced base-phones to create composite enhanced phones, said enhanced base-phones including articulator noises l#, b#, hh#, w#, g#, ly#, ll#, and lq#;
producing a detailed transcription of said input speech data using a transcription process that selects appropriate phones from said enhanced phone set to represent said input speech data; and
applying transformation rules to said transcription to produce a transformed transcription, said transformed transcription being used to create a phonetic dictionary for a speech recognition process.

44. A method for speech processing, comprising:
providing an enhanced phone set that includes enhanced base-phones for representing input speech data, acoustic-phonetic symbols that represent acoustic-phonetic content of said input speech data, and connectors for extending said enhanced base-phones by selectively connecting said acoustic-phonetic symbols to said enhanced base-phones to create composite enhanced phones;
producing a detailed transcription of said input speech data using a transcription process that selects appropriate phones from said enhanced phone set to represent said input speech data, said acoustic-phonetic processes represented by said acoustic-phonetic symbols including an epenthetic vowel; and
applying transformation rules to said transcription to produce a transformed transcription, said transformed transcription being used to create a phonetic dictionary for a speech recognition process.

45. The method of claim 44, wherein said connectors include a character ">" that is placed left of one of said enhanced base-phones to indicate that one of said acoustic-phonetic processes affects a beginning of said one of said enhanced base-phones, said connectors including a character "<" that is placed right of said one of said base-phones to indicate that said one of said acoustic-phonetic processes affects an ending of said one of said enhanced base-phones, said connectors including a character "=" that is placed right of said one of said base-phones to indicate that said one of said acoustic-phonetic processes affects an entirety of said one of said enhanced base-phones, said connectors include a character "^" that is placed right of said one of said base-phones to indicate that said one of said acoustic-phonetic processes occurred completely within said one of said enhanced base-phones.

46. The method of claim 44, wherein said transformation rules include merge-type transformation rules that combine two adjacent phones in said detailed transcription into a single phone selected from said enhanced phone set, said transformation rules including split-type transformation rules that separate a first phone in said detailed transcription into two different phones selected from said enhanced phone set, said transformation rules including replace-type transformation rules that replace a second phone in said detailed transcription with a first different phone selected from said enhanced phone set, said transformation rules including change-in-context transformation rules that change a third phone in said detailed transcription to a second different phone selected from said enhanced phone set depending on a surrounding context of said input speech data.

47. The method of claim 44 wherein at least one of said composite enhanced phones includes a plurality of said connectors that extend a corresponding one of said enhanced base phones with a plurality of said acoustic-phonetic symbols.

48. A method for speech processing, comprising:
providing an enhanced phone set that includes enhanced base-phones for representing input speech data, acoustic-phonetic symbols that represent acoustic-phonetic content of said input speech data, and connectors for extending said enhanced base-phones by selectively connecting said acoustic-phonetic symbols to said enhanced base-phones to create composite enhanced phones;
producing a detailed transcription of said input speech data using a transcription process that selects appropriate phones from said enhanced phone set to represent said input speech data; and
applying transformation rules to said transcription to produce a transformed transcription, said transformed transcription being used to create a phonetic dictionary for a speech recognition process, said transformation rules including a first merge rule that merges an original phone bcl and an original phone b into a merged phone b, said transformation rules including a second merge rule that merges an original phone tcl and an original phone t into a merged phone t, said transformation rules including a third merge rule that merges an original phone kcl and an original phone k into a merged phone k.

49. A method for speech processing, comprising:
providing an enhanced phone set that includes enhanced base-phones for representing input speech data, acoustic-phonetic symbols that represent acoustic-phonetic content of said input speech data, and connectors for extending said enhanced base-phones by selectively connecting said acoustic-phonetic symbols to said enhanced base-phones to create composite enhanced phones;
producing a detailed transcription of said input speech data using a transcription process that selects appropriate phones from said enhanced phone set to represent said input speech data; and
applying transformation rules to said transcription to produce a transformed transcription, said transformed transcription being used to create a phonetic dictionary for a speech recognition process, said transformation rules including a first split rule that splits an original phone em into a first split phone ah and a second split phone m, said transformation rules including a second split rule that splits an original phone or into a first split phone ao and a second split phone r, said transformation rules including a third split rule that splits an original phone al into a first split phone aa and a second split phone l, said transformation rules including a fourth split rule that splits an original phone aa=n into a first split phone aa and a second split phone n.

50. A method for speech processing, comprising:
providing an enhanced phone set that includes enhanced base-phones for representing input speech data, acoustic-phonetic symbols that represent acoustic-phonetic content of said input speech data, and connectors for extending said enhanced base-phones by selectively connecting said acoustic-phonetic symbols to said enhanced base-phones to create composite enhanced phones;
producing a detailed transcription of said input speech data using a transcription process that selects appropriate phones from said enhanced phone set to represent said input speech data; and
applying transformation rules to said transcription to produce a transformed transcription, said transformed transcription being used to create a phonetic dictionary for a speech recognition process, said transformation rules including a first replace rule that replaces an original phone gg with a replacement phone g, said transformation rules including a second replace rule that replaces an original phone qclq with a replacement phone q, said transformation rules include a third replace rule that replaces an original phone p=v with a replacement phone b.

51. A method for speech processing, comprising:
providing an enhanced phone set that includes enhanced base-phones for representing input speech data, acoustic-phonetic symbols that represent acoustic-phonetic content of said input speech data, and connectors for extending said enhanced base-phones by selectively connecting said acoustic-phonetic symbols to said enhanced base-phones to create composite enhanced phones;
producing a detailed transcription of said input speech data using a transcription process that selects appropriate phones from said enhanced phone set to represent said input speech data; and
applying transformation rules to said transcription to produce a transformed transcription, said transformed transcription being used to create a phonetic dictionary for a speech recognition process, said transformation rules including a change-in-context rule that replaces an original phone aa=n with a changed-context phone aa<n m ng.

* * * * *